United States Patent
Tiesler

(10) Patent No.: US 7,261,450 B2
(45) Date of Patent: Aug. 28, 2007

(54) DUAL FUNCTION CONSOLE LAMP WITH INTEGRATED SWITCHING

(75) Inventor: John M Tiesler, Harrison Township, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 90 days.

(21) Appl. No.: 10/709,785

(22) Filed: May 27, 2004

(65) Prior Publication Data

US 2005/0276056 A1 Dec. 15, 2005

(51) Int. Cl.
*F21V 21/14* (2006.01)

(52) U.S. Cl. ............... 362/523; 362/259; 362/287; 362/427; 362/479; 362/490; 362/492; 362/802

(58) Field of Classification Search ............... 362/471, 362/479, 490, 492, 802, 269, 287, 427, 523
See application file for complete search history.

(56) References Cited

U.S. PATENT DOCUMENTS

| | | | |
|---|---|---|---|
| 2,996,608 A * | 8/1961 | Clayton ............... 362/490 |
| 4,600,978 A * | 7/1986 | Kimura ............... 362/365 |
| 4,628,417 A * | 12/1986 | Kaminski et al. ........ 362/485 |
| 4,686,609 A | 8/1987 | Dykstra et al. |
| 5,070,434 A | 12/1991 | Suman et al. |
| 5,508,897 A | 4/1996 | Van Order |
| 5,526,241 A | 6/1996 | Ferrell |
| 5,938,321 A | 8/1999 | Bos et al. |
| 5,951,155 A | 9/1999 | Lanser |
| 6,092,917 A * | 7/2000 | Litke et al. ........... 362/490 |
| 6,139,172 A | 10/2000 | Bos et al. |
| 6,412,973 B1 | 7/2002 | Bos et al. |
| 6,502,969 B2 | 1/2003 | Logel et al. |
| 2002/0093826 A1 | 7/2002 | Bos et al. |
| 2002/0186567 A1 | 12/2002 | Brown |
| 2003/0133307 A1* | 7/2003 | Sugihara et al. ......... 362/490 |

* cited by examiner

Primary Examiner—Stephen F. Husar
Assistant Examiner—Meghan K. Dunwiddie
(74) Attorney, Agent, or Firm—Bir Law, PLC; David S. Bir

(57) ABSTRACT

Dual function console lighting with integrated switching includes a lamp housing held by a retainer within a bezel secured to a vehicle interior. The lamp housing includes eccentrically positioned collinear pivot arms relative to a central longitudinal axis of a lamp positioned within the housing. The pivot arms engage the retainer to hold the lamp housing within the retainer while allowing the lamp housing to pivot relative to the plane of the retainer. The retainer is rotatably held within the bezel by a plurality of snap features spaced around its circumference, allowing the lamp housing and retainer to rotate. A latching mechanism holds the lamp housing in a retracted position with a lens of the housing preferably substantially flush relative to immediately surrounding portions of the bezel. A spring provides a force to pivot the housing about the pivot arms to a second position when the latch is released. An integrated switch is operated by movement of the housing between the first and second positions to turn the lamp on in the extended position. A second switch is provided to select manual or automatic operation of the lamp when in the retracted position. Automatic operation may be actuated by a remotely located auxiliary switch, such as a door switch, for example. The lamp housing preferably includes an integrated lens that includes a protrusion to facilitate rotation of the housing within the retainer. A dimple may also be providing in the lens to facilitate operation of the integrated switch.

19 Claims, 4 Drawing Sheets

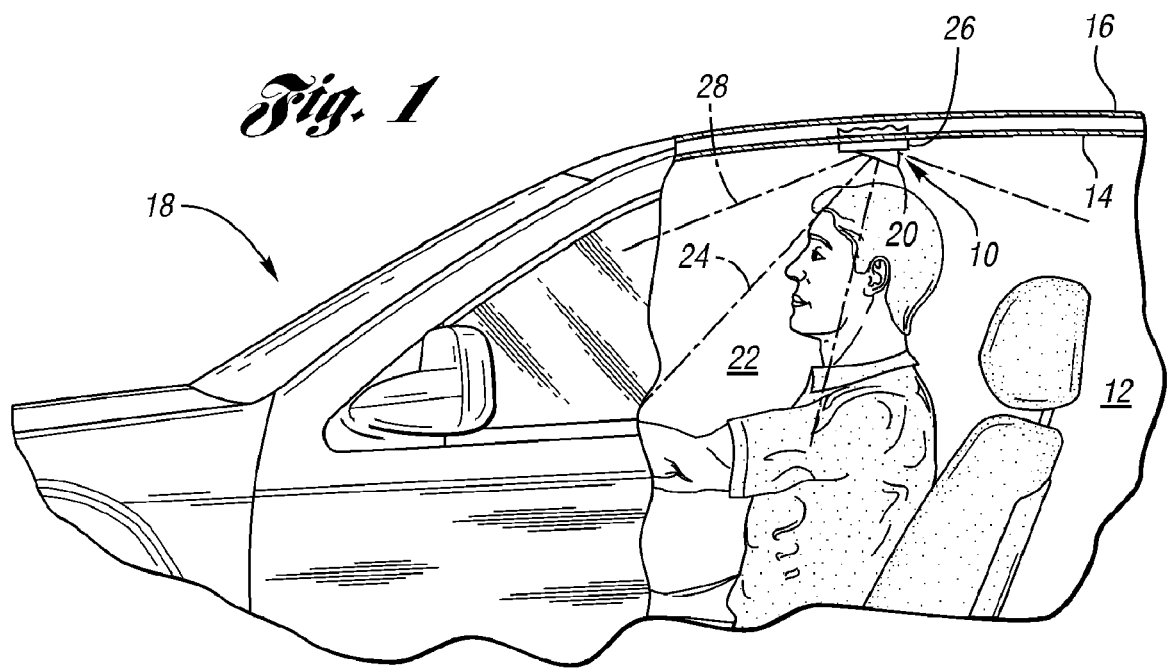
Fig. 1
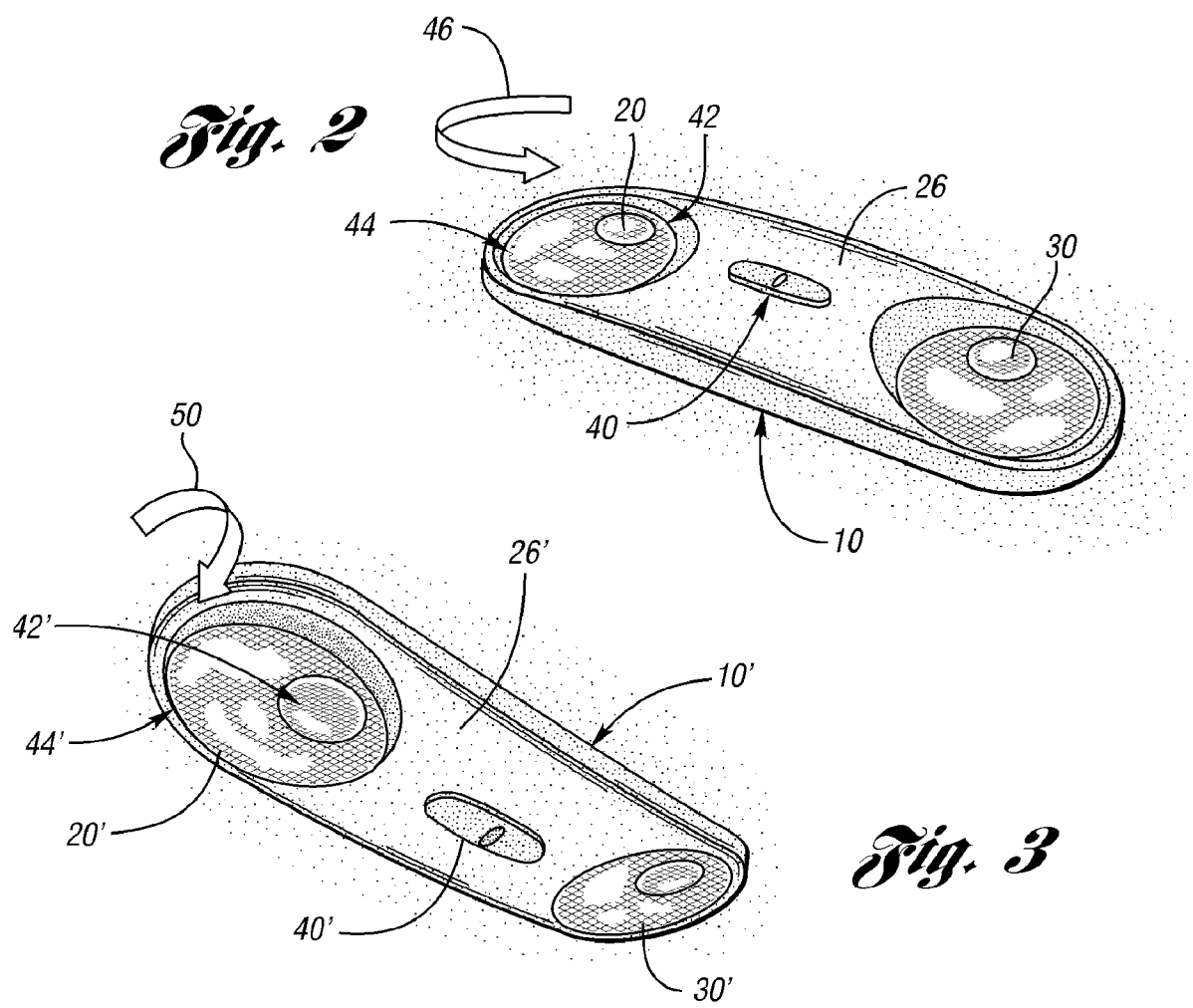
Fig. 2
Fig. 3

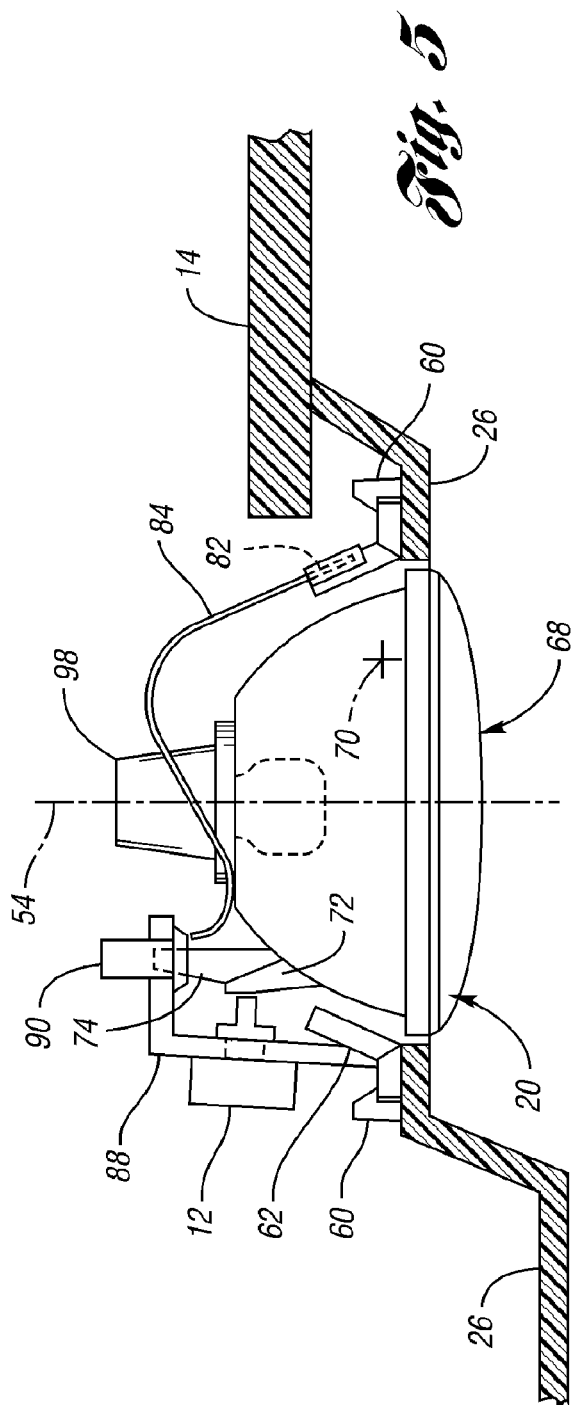
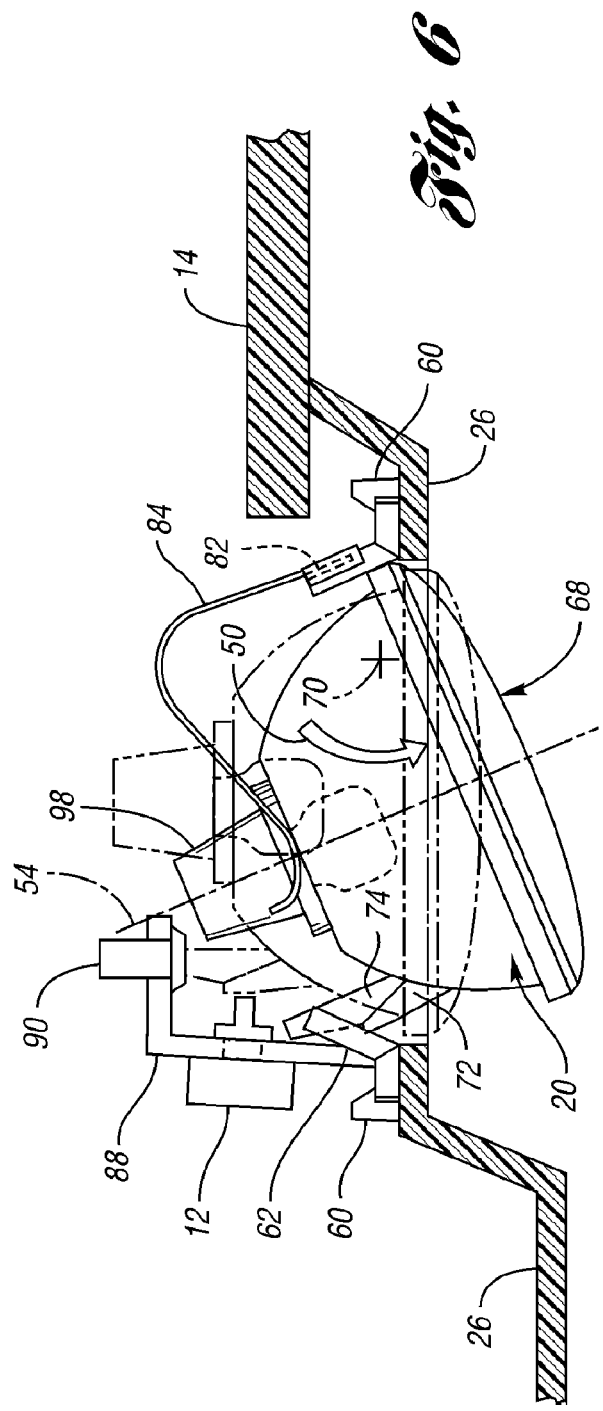

DUAL FUNCTION CONSOLE LAMP WITH INTEGRATED SWITCHING

BACKGROUND OF INVENTION

1. Field of the Invention

The present invention relates to dual function lighting systems and methods for a vehicle console.

2. Background Art

As travelers and commuters spend an increasing amount of time in various types of vehicles, such as automobiles, trucks, buses, airplanes, watercraft, trains, and the like, the demand for aesthetically pleasing accessories with easy to operate functions continues to grow. Consumers expect enhancement of basic features, such as interior lighting, as models change from year to year. Likewise, manufacturers are continually examining new materials, designs, and assembly procedures to meet the consumer demand while attempting to reduce complexity and cost.

SUMMARY OF INVENTION

The present invention includes a dual function interior console lamp having a first position to provide dome or general-purpose ambient lighting and a second position to provide a positionable reading lamp. The dome position is preferably flush relative to an associated bezel secured to the vehicle interior headliner. The reading lamp position is preferably angled toward an expected target reading location and is capable of being swiveled or rotated using a small protrusion or dimple in the lamp lens. An integrated switching function provides a parallel power source to power the lamp when placed in the reading position and switch off the lamp in the dome position. A main switch selects manual or automatic lamp operation for the dome position that may be operated in conjunction with an auxiliary switch or signal, such as a door switch, for example. In one embodiment, the invention includes a lamp housing held by a retainer within a bezel secured to a vehicle interior. The lamp housing includes eccentrically positioned collinear pivot arms relative to a central longitudinal axis of a lamp positioned within the housing. The pivot arms engage the retainer to hold the lamp housing within the retainer while allowing the lamp housing to pivot relative to the plane of the retainer. The retainer is rotatably held within the bezel by a plurality of snap features spaced around its circumference, allowing the lamp housing and retainer to rotate. Rotation of the retainer and lamp housing may be limited by one or more of the snap features. A latching mechanism holds the lamp housing in a first (retracted) position with a lens of the housing preferably substantially flush relative to immediately surrounding portions of the bezel. A spring provides a force to pivot the housing about the pivot arms to a second (extended) position when the latch is released. An integrated switch is operated by movement of the housing between the first and second positions to turn the lamp on in the extended position. A second switch is provided to select manual or automatic operation of the lamp when in the retracted position. Automatic operation may be actuated by a remotely located auxiliary switch, such as a door switch, for example. The lamp housing preferably includes an integrated lens that includes a protrusion to facilitate rotation of the housing within the retainer. A dimple may also be providing in the lens to facilitate operation of the integrated switch.

The present invention provides a number of advantages. For example, the present invention provides aesthetically pleasing interior lighting by integrating switching with lamp positioning from a dome position to a reading position. The present invention provides a dual function interior lamp with a flush or recessed style dome position and a user-controllable reading position to direct lighting as desired. The dimple feature and/or protrusion on the lamp lens facilitate positioning and switching of the lamp. The dimple feature may also function as a lens to focus a portion of the light and increase its intensity on a desired target location. The protrusion or rib facilitates rotation of the lamp housing to direct the light to a desired location when in the extended position. The dual function lamp of the present invention also provides improved packaging that may result in an associated cost reduction.

The above advantage and other advantages and features of the present invention will be readily apparent from the following detailed description of the preferred embodiments when taken in connection with the accompanying drawings.

BRIEF DESCRIPTION OF DRAWINGS

FIG. 1 is a partial cut-away view of a representative application for a dual function lamp according to the present invention;

FIG. 2 is a perspective view of one embodiment of a dual function lamp according to the present invention with a recessed stowed (or retracted) position when functioning as a dome lamp;

FIG. 3 is a perspective view of another embodiment of a dual function lamp having one lamp in a flush stowed position and a second lamp in an extended position when functioning as a reading lamp according to the present invention;

FIG. 5 is a longitudinal cross-section of FIG. 4 with the lamp in a refracted position and having a recessed bezel according to one embodiment of the present invention;

FIG. 6 is a longitudinal cross-section of FIG. 4 with the lamp in an extended position and having a recessed bezel according to one embodiment of the present invention.

DETAILED DESCRIPTION

Figure 4:
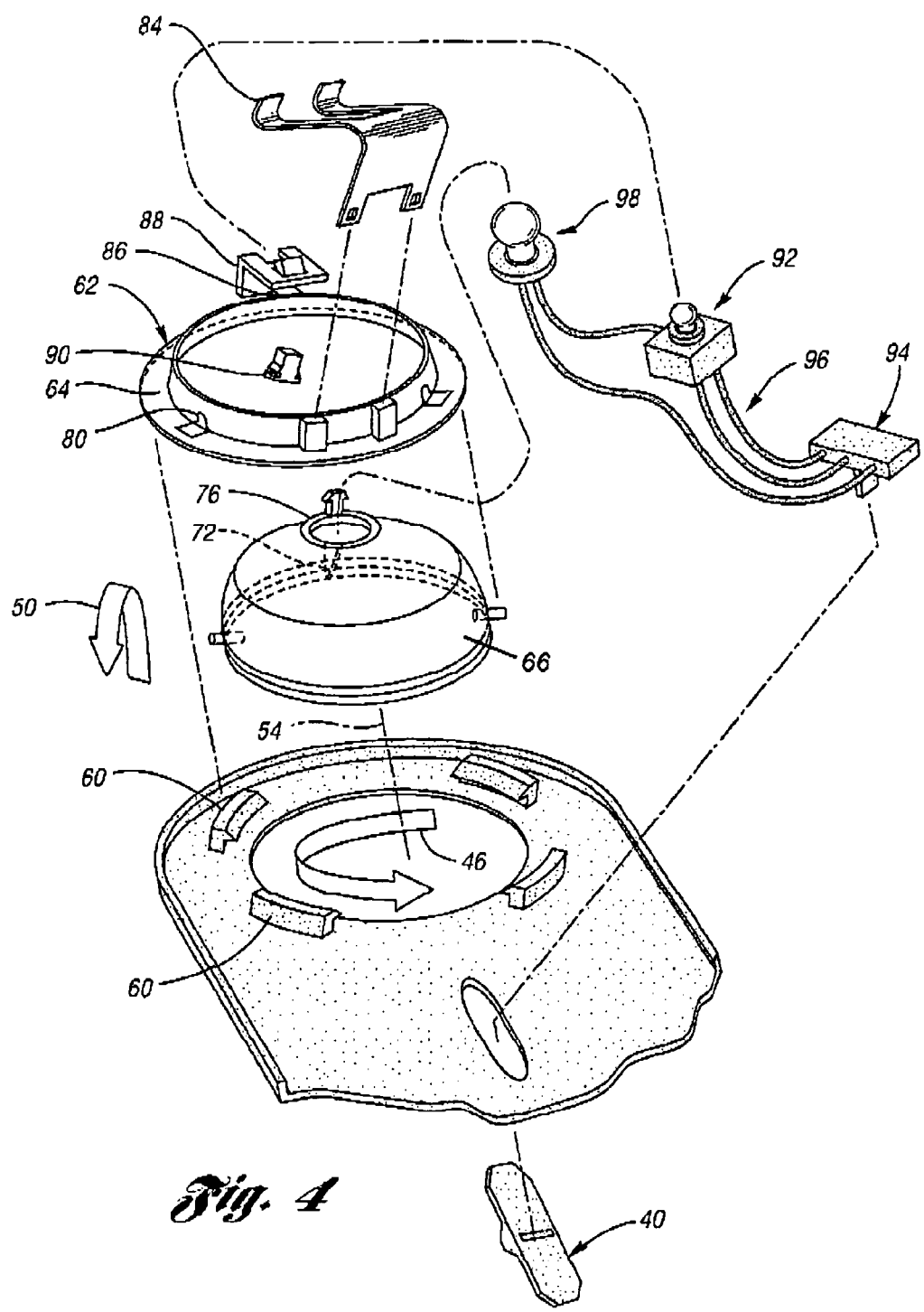
FIG. 4 is an assembly drawing of a dual function lamp according to one embodiment of the present invention.

Referring now to FIG. 1, a perspective view of one embodiment of a dual function console lamp with integrated switching according to the present invention is shown. As those of ordinary skill in the art will appreciate, various features of the present invention illustrated and described with reference to the figures may be combined in ways other than those illustrated and described to provide dual function console lighting consistent with the teachings of the present invention. The combinations of features shown in the figures are representative only for ease of description and illustration.

FIG. 1 illustrates a representative application for a dual function console lamp 10 with integrated switching according to one embodiment of the present invention. Dual function console lamp 10 is preferably positioned within an interior portion 12 of a vehicle. In the illustrated embodiment, dual function console lamp 10 is disposed in an overhead position secured to a headliner 14, which is preferably secured to the roof 16 of vehicle 18. In the embodiment illustrated in FIG. 1, vehicle 18 is an automotive vehicle. However, those of ordinary skill in the art will recognize that the present invention may be utilized in various types of vehicles including trucks, buses, airplanes, watercraft, trains, and the like. Dual function console lamp 10 is shown in an extended or reading position where lamp housing 20 pivots about an eccentrically located first axis to illuminate a target area 22 generally represented by broken lines 24. In the extended or reading position, lamp housing 20 includes a portion that extends below bezel 26. When placed in the retracted or dome position (not shown), dual function console lamp 10 provides general or ambient illumination of interior portion 12 as generally represented by broken lines 28. In the retracted position, lamp housing 20 is preferably flush or recessed relative to bezel 26.

Referring now to FIG. 2, a perspective view of one embodiment of a dual function lamp according to the present invention is shown having a recessed retracted position when functioning as a dome lamp. In this embodiment, dual function console lamp 10 includes a plurality of lamp housing assemblies 20, 30 that are illustrated in a stowed or retracted position with the housing assemblies 20, 30 recessed relative to bezel 26. Lamp housing assemblies 20, 30 preferably include an integrated lens having a recess or dimple 42 to facilitate operation of an integrated switch and a rib or protrusion 44 to facilitate rotational positioning of the housing assembly as generally represented by arrow 46 and as illustrated and described in greater detail with reference to FIGS. 4-7. Dual function console lamp 10 also includes a main switch 40, which preferably includes three positions corresponding to "off", "on", and "automatic" to control operation of the lamps within lamp housing assemblies 20, 30 when in the stowed or retracted position to provide ambient or dome lighting. For example, when switch 40 is placed in the "off" position, lamps within housing assemblies 20, 30 are off when they are placed in the stowed or retracted position. When switch 40 is placed in the "on" position, lamps within housing assemblies 20, 30 are on when they are placed in the stowed or retracted position. In the "automatic" position, lamps within housing assemblies 20, 30 are remotely controlled by an auxiliary switch, such as a door switch, for example. Illumination of lamps within housing assemblies 20, 30 is controlled by a parallel integrated switch independent of the main or manual switch when in the extended or reading/map position as described in greater detail below.

FIG. 3 is a perspective view of another embodiment of a dual function console lamp 10' having one lamp housing assembly 20' in an extended position when functioning as a reading lamp and a second lamp housing assembly 30' in a flush stowed position when functioning as a dome lamp according to the present invention. In this embodiment, lamp housings 20', 30' are generally flush relative to bezel 26' when placed in the retracted or stowed position to operate as a dome lamp. Primed reference numerals in FIG. 3 designate components or features that are similar in structure and function to those previously described with reference to FIGS. 1 and 2. Lamp housing assembly 20' has been placed in the extended or reading/map lamp position by rotation about an eccentrically positioned axis as indicated generally by arrow 50. Recess or dimple 42' may be used to facilitate positioning of housing assembly 20' in the extended position while operating an integrated switch to illuminate the enclosed lamp as described in greater detail below with reference to FIGS. 4-7. In addition, dimple 42' may be used to selectively focus a portion of the light and increase its intensity on a desired target. The remaining portion of the lenses of housing assemblies 20', 30' preferably includes optical features to diffuse the light within a desired target cone. Protrusion or rib 44' may be used to selectively rotate housing assembly 20' about a second longitudinal axis extending through the center of the lens and associated lamp and illustrated generally by arrow 46 (FIG. 2). Regardless of the position of main switch 40', placing housing assembly 20' (and/or 30') in the extended position operates a corresponding integrated switch (FIGS. 4-6) to illuminate the associated lamp. Similarly, placing housing assembly 20' (and/or 30') in the stowed or retracted position operates a corresponding integrated switch (FIGS. 4-6) to remove power from the associated lamp, although power may be provided by the main switch as described above.

Referring now to FIGS. 1-7, dual function lamp according to the present invention is shown. Switch button 40 engages main switch 94 through a corresponding aperture 52 in bezel 26. As described above, switch button 40 preferably operates main switch 94 to provide "off", "on", and "automatic" functions for the lights when in the retracted or dome lighting position. Bezel 26 includes a plurality of snap features or retaining members 60 to rotatably hold flange 64 of lamp housing retainer ring 62. As illustrated, snap features 60 are preferably spaced around the circumference of a corresponding aperture adapted to receive housing assembly 20. Lamp housing assembly 20 preferably includes a reflector portion 66 sonically welded to a lens portion 68. Reflector portion 66 includes any suitable reflective material on the interior portion and is preferably shaped to provide a desired illumination area or pattern. Lamp housing 20 includes collinear pivot arms 70 eccentrically positioned relative to a central longitudinal axis 54 extending generally through the center of a lamp 98 and lens 68 of housing assembly 20 when fully assembled. Pivot arms 70 engage corresponding vertical pivot snap provisions 80 in tile lamp housing retainer ring 62 to hold lamp housing assembly 20 within retainer ring 62 while allowing lamp housing 20 and retainer ring 62 to rotate within the plane of the bezel as generally indicated by arrow 46. Lamp housing assembly 20 may include one or more protrusions or ribs 86 to limit rotation of retainer ring 62 between adjacent snap features 60.

As also illustrated, reflector portion 66 of lamp housing assembly 20 may include a striker rib 72 and associated push/push latch striker feature 74 to operate integrated switch 92 via button 90 when lamp housing assembly 20 pivots out of the plane of the bezel about vertical pivot arms 70 in a direction generally indicated by arrow 50. Lamp housing assembly 20 also includes an aperture 76 adapted to receive and engage a lamp 98 and associated socket.

Lamp housing retainer ring 62 may also include a mounting flange 88 to receive push/push latch assembly 90, which is of conventional design and operates by alternately latching and releasing the latch striker when the striker engages the latching mechanism. In addition, lamp housing retainer ring 62 may include one or more spring clip receptacles 82 adapted to receive a corresponding spring clip 84. As illustrated, spring clip 84 includes a fork cutout design to provide clearance for the integrated latch/switch. Spring clip 84 provides a force to pivot lamp housing assembly 20 about pivot arms 70 to an extended or reading position when the push/push latch assembly 90 is released. The integrated reading lamp switch 92 is operated by movement of the lamp housing assembly 20 between the retracted (dome) position and the extended (reading) position. Integrated reading lamp switch 92 is connected to main switch 94 and any suitable power source by one or more conductors within a wiring harness 96, for example.

A longitudinal cross-section of the dual console lamp shown in FIG. 4 is shown in FIGS. 5 and 6. FIG. 5 illustrates a lamp in a retracted (dome/stowed) position with a recessed bezel according to one embodiment of the present invention while FIG. 6 illustrates the lamp in an extended (reading/map) position. As shown in FIG. 5, when lamp housing assembly 20 is in the retracted position, the outside edges of lens portion 68 are substantially flush with immediately surrounding portions of bezel 26. Depending upon the particular implementation, the apex of lens portion 68 may extend below bezel 26 as illustrated. When in the retracted position, switch striker rib 72 holds reading lamp switch 12 in the off position. Lamp housing assembly 20 is held against the force of spring clip 84 by push/push latch striker feature 74 which engages push/push latch assembly 90. In this position, lamp 98 may be operated by main switch 94 (FIG. 4) in the "automatic" or "on" mode as described above. As illustrated in FIGS. 5 and 6, pivot pins 70 are positioned eccentrically or off-axis relative to central longitudinal axis 54 extending through the center of lamp 98 and lens portion 68 of lamp housing assembly 20. Stated differently, pivot pins 70 are positioned on a non-diametrical chord of the lamp housing so that the majority of the housing extends below the bezel when placed in the reading lamp position to provide more efficient use of the available light. If the pivot pins 70 were positioned near or on a diameter of the housing, pivoting of the lamp would result in more of the light being blocked by the surrounding bezel reducing the lighting efficiency and producing potentially undesirable shadows in the target illumination area.

A dual function console lamp according to one embodiment of the present invention is illustrated in the extended or reading/map position in FIG. 6. To operate the lamp from the retracted position illustrated in FIG. 5, a user pushes on the lens portion 68, preferably at the dimple feature (FIGS. 1 and 2), which causes the push/push latch assembly 90 to release striker 74 so that the spring force exerted by spring clip 84 pushes the lamp downward. As lamp housing assembly 20 pivots about pivot arms 70, integrated switch striker rib 72 operates integrated switch 12 to supply power to lamp 98. Lamp housing assembly 20 may also be rotated in the plane of the bezel via rotation of retainer ring 62 within snap features 60 to illuminate a desired target area. Lamp housing assembly 20 is held within retainer ring 62 via pivot pins 70 as illustrated and described with reference to FIG. 4.

To return the lamp to the stowed (dome) position, a user pushes on lens portion 68 against spring force of spring clip 84 such that lamp housing assembly 20 pivots toward the retracted position about pivot arms 70. Switch striker rib 72 operates integrated switch 12 to turn lamp 98 off (depending upon the position of main switch 94 as described above) while push/push latch striker feature 74 is engaged by the push/push latch assembly 90 to hold lamp housing assembly 20 in the stowed position as illustrated in FIG. 5.

Figure 7:
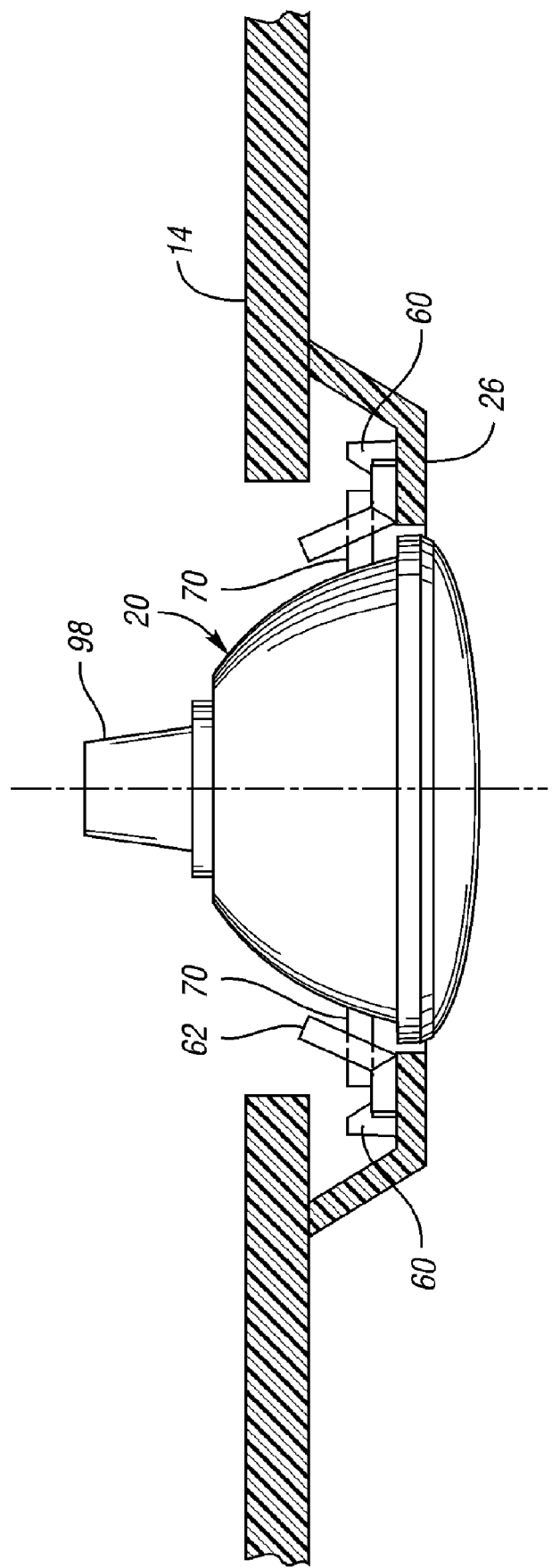
FIG. 7 is a longitudinal cross-section of FIG. 4 with the lamp in a refracted position according to one embodiment of the present invention.

FIG. 7 is a transverse cross-section of the lamp shown in FIG. 4 with the lamp in a retracted (dome) position according to one embodiment of the present invention. Lamp housing assembly 20 is held within retainer ring 62 by pivot arms 70. Retainer ring 62 is rotatably engaged with snap features 60 of bezel 26 allowing lamp housing assembly 20 to rotate in the plane of the bezel about a first axis normal to the plane of the bezel when in either the retracted or the extended position. Pivot arms 70 engage retainer ring 62 and allow lamp assembly housing 20 to pivot or rotate about a second axis defined by pivot arms 70 into an extended position to illuminate a desired target area.

As such, a dual function console lamp with integrated switching according to the present invention includes both a dome lamp function and a reading/map function based on position of the lamp housing and associated lamp, which move in unison. Rotations of the lamp housing assembly about two axes are provided. A vertical plane rotation about an eccentrically positioned axis relative to a central longitudinal axis actuates the integrated switch and allows the lamp housing assembly to pivot toward a user's target reading position. A horizontal plane rotation about a centrally located longitudinal axis extending through the lamp and lens portion of the housing assembly allows the lamp housing assembly to rotate to direct light fore and aft toward a desired target location. Rotation of the housing assembly for horizontal positioning is facilitated by a protrusion or rib feature on the lamp lens. Rotation about the eccentrically positioned axis for vertical positioning and actuation of the integrated switch is performed by pushing on the lamp lens and is facilitated by a dimple or recessed feature to release the lamp housing assembly and position it into a reading position. The lamp may be stowed or stored into a flush or recessed position relative to the bezel by pushing the lamp assembly toward its latching position, which is facilitated by the dimple feature.

The present invention thus provides aesthetically pleasing interior lighting by integrating switching with lamp positioning from a dome position to a reading position. The dual function interior lamp of the invention provides a flush or recessed style dome position and a user-controllable reading position to direct lighting as desired. Operation and positioning of the lamp is facilitated by the dimple feature and/or protrusion on the lamp lens with the dimple feature also functioning to focus a portion of the light and increase its intensity on a desired target location. The improved packaging afforded by the present invention may also result in an associated cost reduction.

While the best mode for carrying out the invention has been described in detail, those familiar with the art to which this invention relates will recognize various alternative designs and embodiments for practicing the invention as defined by the following claims.

The invention claimed is:

1. A dual function console lamp comprising:
    a bezel having at least one lamp housing aperture;
    a lamp housing having eccentrically positioned outwardly extending collinear pivot pins that allow the lamp housing to pivot from a retracted dome lighting position in a plane generally parallel to the bezel, out of the plane to an extended reading light position;
    a retainer for rotatably securing the lamp housing to the bezel so that the lamp housing can rotate about an axis generally normal to the bezel; and
    a switch operated by movement of the lamp housing between the retracted and extended positions.

2. The dual function console lamp of claim 1 further comprising:
    a manually operated switch to control illumination of a lamp within the lamp housing when the lamp housing is in the retracted position.

3. The dual function console lamp of claim 1 wherein the lamp housing includes a reflector portion and a lens portion, the lens portion being substantially flush or recessed relative to surrounding portions of the bezel when in the retracted position.

4. The dual function console lamp of claim 1 wherein the lamp housing includes a reflector portion and a lens portion, the lens portion having a dimple feature to facilitate movement of the lamp housing between the retracted and extended positions.

5. The dual function console lamp of claim 1 wherein the lamp housing includes a reflector portion and a lens portion, the lens portion having a protrusion to facilitate rotation of the lamp housing in the plane generally parallel to the retainer.

6. The dual function console lamp of claim 1 wherein the bezel includes a plurality of retaining members disposed about the aperture and wherein the retainer includes a flange that engages the plurality of retaining members.

7. The dual function console lamp of claim 6 wherein the lamp housing includes a protrusion that extends between adjacent retaining members to limit rotation of the lamp housing.

8. The dual function console lamp of claim 1 wherein the retainer includes a latching assembly to releasably hold the lamp housing in the retracted position.

9. The dual function console lamp of claim 1 further comprising a spring positioned to exert a moment about the pivot pins to oppose movement from the extended to the retracted position.

10. The dual function console lamp of claim 1 wherein the housing includes a striker rib that actuates the switch when the housing assembly moves between the extended and retracted positions.

11. A console lamp for a vehicle interior, the lamp comprising:
- a bezel having a plurality of lamp housing apertures, a main switch aperture, and a plurality of retaining members positioned around each lamp housing aperture;
- a lamp housing corresponding to each lamp housing aperture, the lamp housing having non-diametrically positioned pivot pins that allow the lamp housing to pivot from a retracted dome lighting position to an extended reading light position, the lamp housing also including a latch striker and a switch striker;
- a retainer ring having a flange for engaging the retaining members of a corresponding lamp housing aperture for rotatably securing the lamp housing to the bezel so that the retainer ring and lamp housing can rotate within the bezel, the retainer ring including a plurality of pivot apertures cooperating with the pivot pins to pivotally hold the lamp housing within the retainer and a mounting flange for mounting a latching mechanism;
- a latching mechanism secured to the mounting flange for releasably holding the latch striker and the lamp housing in the retracted position;
- a spring engaging the lamp housing and exerting a force to move the lamp housing from the retracted position to the extended position when the latch striker is released by the latching mechanism;
- a hidden switch operated by the switch striker when moving the lamp housing between the retracted and extended positions to illuminate an associated lamp within the lamp housing when the lamp housing is in the extended position; and
- a main switch extending through the switch aperture of the bezel to operate the lamp when the lamp housing is in the retracted position.

12. The console lamp of claim 11 wherein the lamp housing comprises a reflector portion and a lens portion permanently fixed together.

13. The console lamp of claim 12 wherein the lens portion of the lamp housing includes a dimple to facilitate movement of the lamp housing between the extended and retracted positions.

14. The console lamp of claim 12 wherein the lens portion of the lamp housing includes a rib to facilitate rotation of the lamp housing and retainer within the bezel.

15. The console lamp of claim 11 wherein the main switch includes a first position for providing power to a lamp within the lamp housing when in the retracted position, a second position for blocking power to the lamp when in the retracted position, and a third position for operating the lamp when in the retracted position based on operation of an auxiliary switch.

16. The console lamp of claim 11 wherein the spring is held by the retainer.

17. A dual function console lamp for a vehicle interior, the lamp comprising:
- a bezel defining a first plane;
- a housing disposed within an aperture of the bezel and adapted to receive a lamp, the housing being pivotable about a first axis to extend at an angle out of the first plane relative to the bezel to provide illumination to a first target area and to retract substantially flush with the bezel in the first plane to provide illumination to a second target area, the housing being rotatable within the first plane about a second axis; and
- a switch operable by movement of the housing, wherein the switch provides power to the lamp when the housing is pivoted out of the first plane.

18. The dual function console lamp of claim 17 further comprising a spring arranged to provide a force tending to move the housing out of the first plane.

19. The dual function console lamp of claim 18 further comprising a latching mechanism operable to selectively hold the housing in the first plane against the force of the spring.

* * * * *